Oct. 27, 1964

L. D. HAGENBOOK 3,154,163

WHEEL EQUALIZER DEVICE

Filed July 28, 1961

INVENTOR.
Loy D. Hagenbook
BY
Murray G. Gleeson
ATTORNEY

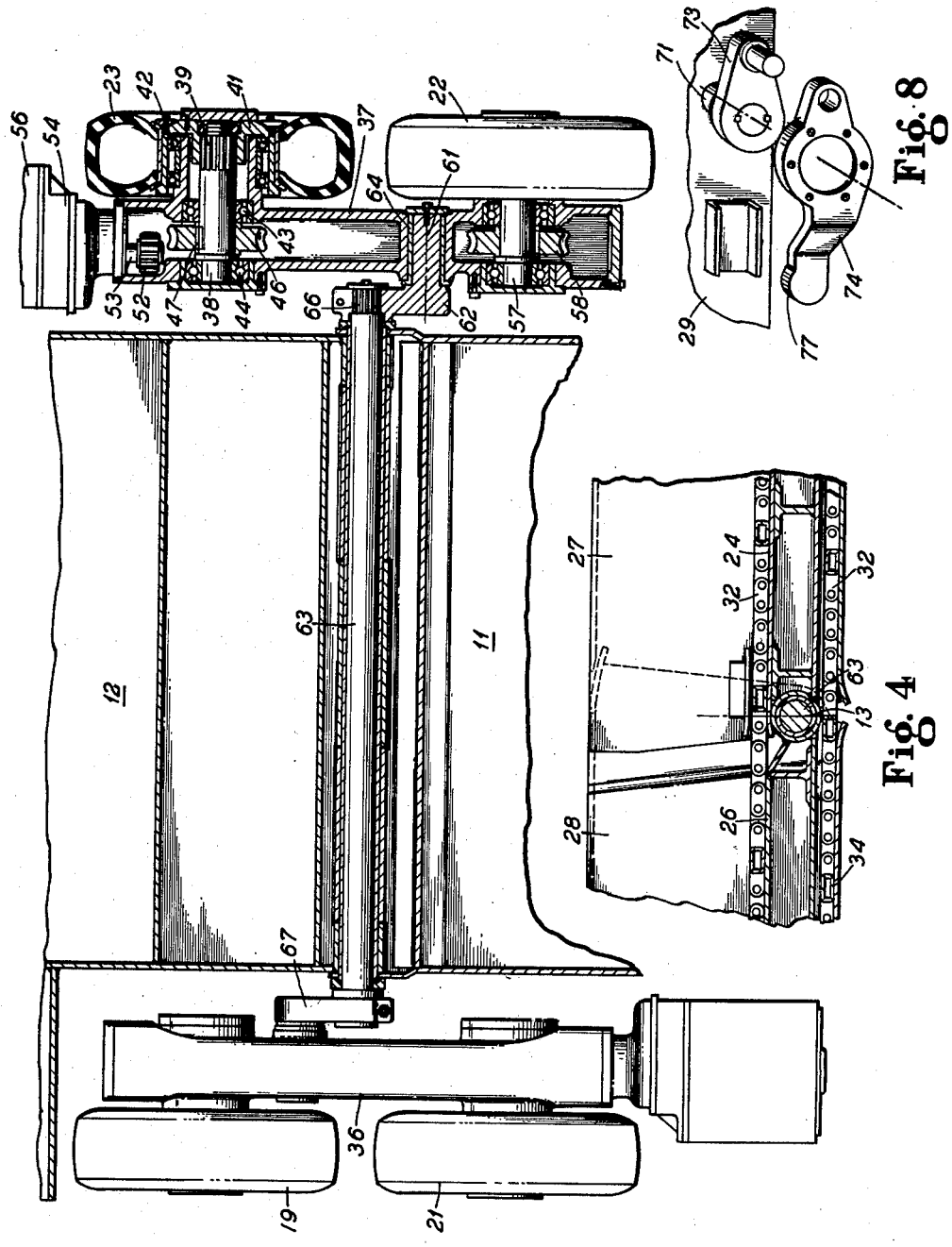

Oct. 27, 1964          L. D. HAGENBOOK          3,154,163
                    WHEEL EQUALIZER DEVICE
Filed July 28, 1961                        3 Sheets-Sheet 3

INVENTOR.
Loy D. Hagenbook
BY Murray A. Gleeson
ATTORNEY

United States Patent Office 3,154,163
Patented Oct. 27, 1964

3,154,163
WHEEL EQUALIZER DEVICE
Loy D. Hagenbook, Chicago, Ill., assignor to Goodman Manufacturing Company, Chicago, Ill., a corporation of Illinois
Filed July 28, 1961, Ser. No. 127,697
8 Claims. (Cl. 180—22)

This invention relates generally to improvements in haulage vehicles and more particularly to equalized wheel mountings for mine shuttle cars.

In low height shuttle cars it is desirable to provide a maximum uninterrupted vertical height in the body and also a maximum of ground clearance under the car. It is also desirable to provide equalized wheel mountings to assure that the wheels will remain in contact with the ground on uneven surfaces.

It is therefore a principal object of the present invention to provide equalized wheel mountings in which a transverse equalizer member remains vertically fixed relative to the car body while the wheels are vertically movable relative to the car body. Another object is to provide equalized wheel mountings in which a transverse equalizer member extends across the car body between upper and lower runs of a conveyor.

Another object is to provide equalized mountings for pairs of tandem wheels on opposite sides of a car body.

A further object is to provide counterpoised drive units for equalized pairs of tandem drive wheels on opposite sides of a shuttle car body.

An additional object is to provide a vertically flexible shuttle car body having a transverse hinge in which the hinge connection includes a transverse wheel equalizer device.

In the drawings:

FIG. 3 is a plan view section drawing illustrating the preferred embodiment of the wheel equalizer of FIG. 1 to enlarged scale;

FIG. 4 is an elevation view, in section, of the equalizer cross shaft shown in FIG. 3;

FIG. 8 is an exploded perspective view to enlarged scale showing details of the wheel mounting device used in the alternative embodiment of FIG. 1.

Figure 1:
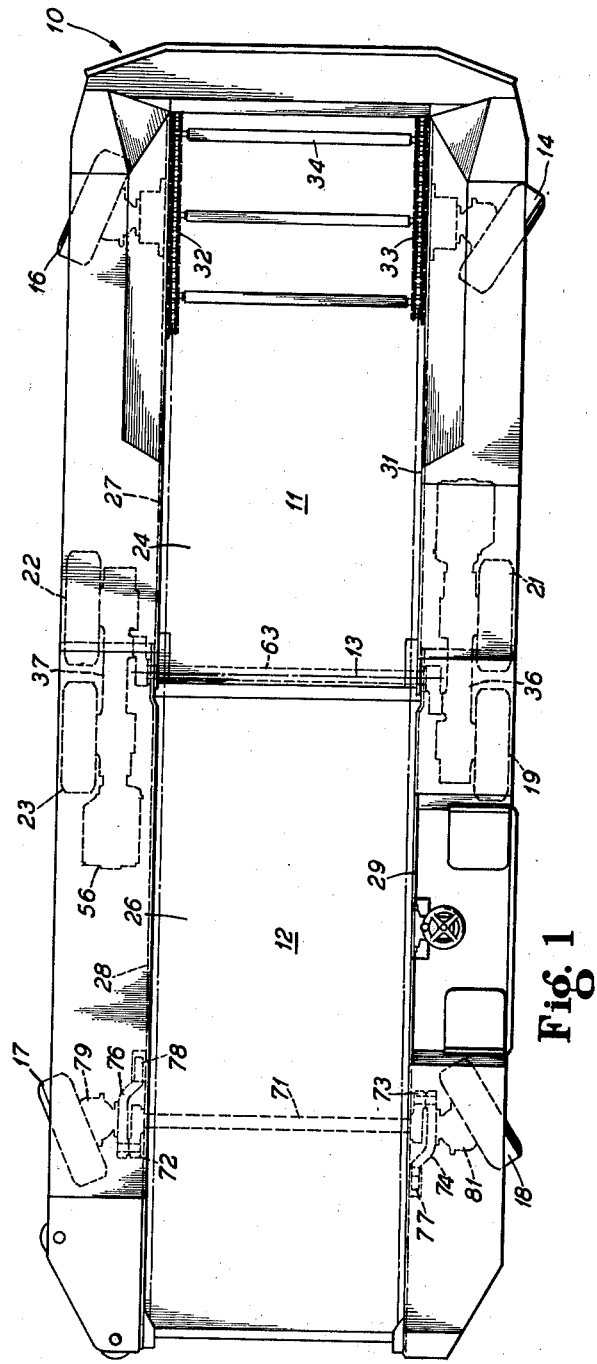
FIGURE 1 is a plan view showing a mine shuttle car having a preferred embodiment of the transverse wheel equalizer of the present invention extending along the hinge axis thereof, and an alternate form thereof connecting wheels at an end of the car.
Figure 2:
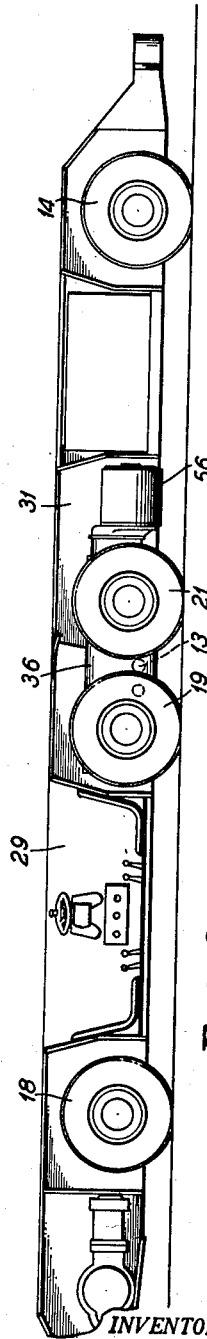
FIG. 2 is an elevation view of the car shown in FIG. 1.

Referring now more particularly to the drawings, the reference character 10 denotes a mine shuttle car having two body portions 11 and 12 hinged together end-to-end about a horizontal transverse axis 13. The car body 10 is supported above the ground by pairs of steerable supporting wheels 14, 16, 17, 18 located at the ends of the car and by two pairs of tandem drive wheels 19, 21, 22, 23 located near the middle of the car.

Each of the body portions 11, 12 has a floor 24, 26 and side walls 27, 28, 29, 31 which define an open end cargo compartment extending along the length of the car 10. As seen in FIG. 4, the walls 27, 28 overlap each other in the vicinity of horizontal hinge axis 13 to provide closed side walls in various hinged positions of body portions 11, 12. An orbitally movable endless chain and flight conveyor 32, 33, 34 extends along the length of the cargo compartment having a carrying reach which rests on the floor 24, 26 and a return reach located beneath the floor.

Mountings for wheels 14 and 16 are connected directly to the car body and are provided with steering means which will not be described here since it forms no part of the present invention.

Figure 5:
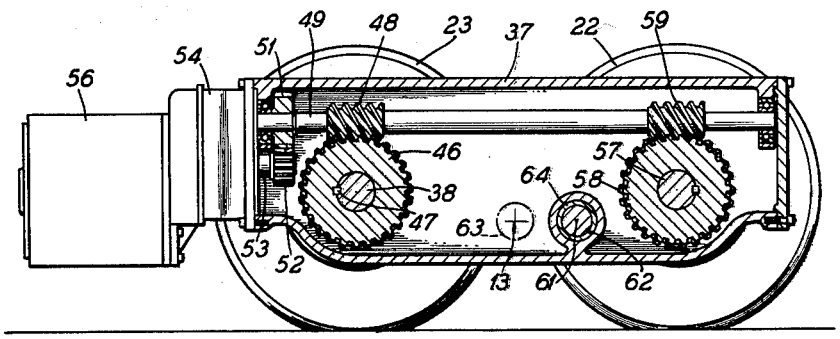
FIG. 5 is an elevation section view of the drive mechanism for one of the pairs of tandem drive wheels.

Wheels 19 and 21 are mounted on a truck beam 36 and wheels 22 and 23 are similarly mounted on a truck beam 37. Referring now to FIGS. 3 and 5, it is seen that wheel 23 is connected to shaft 38 through splines 39 by adapter 41. The wheel 23 is supported on beam 37 through bearings 42. Shaft 38 is supported in beam 37 by bearings 43 and 44. Shaft 38 has a gear 46 connected thereto as by key 47. The gear 46 is in turn driven by worm 48 mounted on drive shaft 49. The drive shaft 49 and worm 48 are driven by gear 51 which in turn is driven by pinion 52. Pinion 52 is mounted on shaft 53 which extends from reducer 54 which in turn is connected to motor 56. Wheel 22 is mounted on truck beam 37 in a manner similar to the mounting for wheel 23 having a shaft 57 and gear 58 driven by worm 59 on drive shaft 49.

Truck beam 37 is journaled in bearing 64 on crank arm 62 about a pivotal axis 61 which is located intermediate the wheel shafts 38 and 57 nearer the wheel shaft 57. Thus the weight of the motor 46 and reducer 54 is carried by wheel 23 while the weight of the car body transmitted through crank arm 62 to the truck beam 37 is carried by both wheel 22 and 23 with wheel 22 carrying the greater part of that weight.

Crank arm 62 is connected as by splines 66 to cross shaft 63 which is journaled in the car body preferably along the axis 13 in the hinge connecting body portions 11 and 12. As seen in FIG. 4, shaft 63 extends across the car body along hinge axis 13 between the upper and lower runs of the conveyor designated by chains 32.

On the opposite side of the car body, another crank arm 67 extends radially from shaft 63 and is arcuately spaced from crank arm 62. This arcuate spacing is shown as a full 180 degrees in the drawings but other spacings may be used with good effect. The combination of shaft 63 and crank 62 and 67 forms a crank axle whose crank throws are deliberately misaligned.

Figure 6:
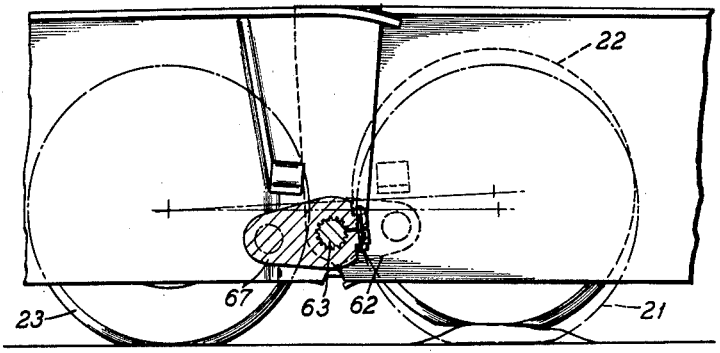
FIG. 6 is an elevation view, partially in section, illustrating the action of the equalizer device when one wheel encounters an irregularity in the floor surface.

The diagram of FIG. 6 illustrates the equalizing action of this modified crank axle. Where one of the tandem wheels 22 encounters a bump in the floor, it rides up and over. In so doing the truck beam 37 is tilted about wheel 23. This tilting of truck beam 37 forces crank throw 62 upward which in turn tends to rotate shaft 63 in a counter clockwise direction when viewed as in FIG. 6. Counter clockwise rotation of shaft 63 tends to force crank throw 67 downward, but since truck beam 36 and tandem wheels 19, 21 are bearing on the ground, the reaction moves shaft 63 and the car body upward thereby increasing the ground clearance beneath the car body in the vicinity of the bump. If the bump in the floor were long enough to span both wheels 22 and 23, the wheel 23 would roll up onto the bump leveling truck beam 37 which would tend to lift crank throw 62 higher. This, in turn, would tend to rotate the shaft 63 and the reaction on truck beam 36 and wheels 19, 21 would raise the car body even higher. The car body would remain level from side to side even though both tandem wheels on one side were higher than the corresponding wheels on the other side.

If opposite wheels 21 and 22 were raised at the same time as in rolling over a timber, both truck beams 36 and 37 would be tilted upward. This condition would raise both crank throws 62 and 67 which would elevate shaft 63 and the car body to provide more clearance underneath the car.

If diagonally opposite wheels 21 and 23 were raised at the same time as when rolling over a timber canted with respect to the axis of the car, both truck beams 36 and 37 would be tilted but in opposite directions. Even though tilted in opposite directions, the crank throws 62 and 67 would be raised which would in turn raise shaft 63 and the car body to increase the clearance beneath the car.

In any of the above described conditions, all four drive wheels bear firmly on the ground to provide undiminished traction even though one of the wheels or any of the combinations of pairs of drive wheels are at a different elevation. In low height cars where small diameter drive wheels must be used, it is desirable to provide multiple drive wheels in order to increase the area of traction surface and to provide equalizer mountings so that the traction surface area is not diminished by having one or more wheels out of contact with the ground when running over uneven floor.

Figure 7:
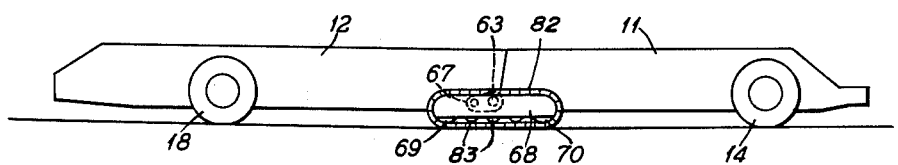
FIG. 7 illustrates another alternate embodiment of the invention in which orbitally movable tractor treads provide traction for the vehicle.

Another form of the invention is shown in FIG. 7 which provides even greater traction surface than the pair of tandem wheels. The truck beams such as 36 are replaced by a tractor bogie frame 68. This bogie frame 68 is equipped with end sprockets 69 and 70 and intermediate bogie wheels 83 which drive and support an orbitally movable tractor tread 82. The tractor bogie frame tilts in a manner similar to the truck beam upon encountering an irregularity in the floor. This in turn elevates one or both of the crank throws to raise the car body and increase the ground clearance.

While the importance of traction surface area has been pointed out above, it should be remembered that steering surface area is also important. Referring to FIGS. 1 and 8, a shuttle car is shown in which one pair of steering wheels 14, 16 is vertically fixed relative to the car body. The driving wheels described above are vertically movable relative to the body in order to remain in contact with the ground at all times. The other pair of steering wheels 17, 18 must also be mounted for vertical movement relative to the car body in order to remain in contact with the ground at all times. I prefer to use an adaptation of the equalizer device described above for mounting the steerable wheels 17, 18. The steerable wheel mountings include a crank axle having a rotatable cross shaft 71 with deliberately misaligned crank throws 72 and 73 located at opposite ends thereof. The crank throws 72, 73 are pivotally connected respectively to arms 76, 74 which are each rotatably and slideably mounted on the car body as at 78 and 77. The wheels 17 and 18 are mounted on steering gear 79 and 81 which are mounted on arms 76 and 74. If the wheel 17 should encounter a bump in the floor, the arm 76 will force throw 72 upward which in turn tends to force the throw 73 downward. Since the wheel 18 is bearing firmly on the ground, the end of the car body will be elevated to provide greater clearance under the car while both wheels 17, 18 bear firmly on the ground.

Having thus shown and described my invention in terms of a preferred embodiment, it will be understood that various other forms and modifications may be made without departing from the spirit and scope of the appended claims.

I claim as my invention:

1. An equalized mine shuttle car comprising:
   a body;
   a pair of supporting wheels mounted on opposite sides of said body near one end thereof;
   a crank axle rotatably mounted on said body remote from said pair of wheels, the throws of said crank axle being axially and arcuately spaced from each other;
   a horizontal guide on each side of said body located adjacent to said crank axle;
   a pair of lever members each having one end pivotally connected to a throw of said crank axle and having another end rockably and slideably mounted in a respective horizontal guide; and
   third and fourth supporting wheels mounted for rotation on respective of said lever members.

2. An equalized mine shuttle car comprising:
   a body;
   first and second supporting wheels mounted on opposite sides of said body near one end thereof;
   a crank axle rotatably mounted on said body remote from said first and second wheels, the throws of said crank axle being axially and arcuately spaced from each other;
   a horizontal guide on each side of said body located adjacent to said crank axle;
   a pair of lever members each having one end pivotally connected to a respective throw of said crank axle and having another end rockably and slideably mounted in a respective one of said horizontal guides; and
   steerable wheel mounting assemblies mounted on each of said lever members.

3. An aqualized mine shuttle car comprising:
   a body;
   first and second supporting wheels mounted on opposite sides of said body near one end thereof;
   a crank axle rotatably mounted on said body remote from said first and second wheels, the throws of said crank axle being axially and arcuately spaced from each other;
   a horizontal guide adjacent said crank axle on each side of said body; and
   a pair of elongated wheel mounting assemblies each having one end slideably and rockably mounted in a respective horizontal guide on said body and having another end pivotally mounted on a respective throw of said crank axle.

4. An equalized mine shuttle car comprising:
   a body;
   a pair of steerable supporting wheels mounted on opposite sides of said body;
   a rotatable crank axle connected to said body remote from said pair of steerable wheels, the throws of said crank axle being axially and arcuately spaced from each other;
   an elongated truck beam pivotally mounted on each said crank throw adjacent a side of said body;
   a pair of drive wheels mounted in tandem relationship on each of said beams, one of said wheels being mounted closer to the pivotal axis of said beam than the other wheel; and
   power means mounted on each of said beams drivingly connected to said pair of wheels, said power means being located remote from said one drive wheel and proximate the said other drive wheel.

5. The structure of claim 4 in which the said one drive wheel on one side of said body is normally aligned with the said other drive wheel on the opposite side of said body.

6. An equalized mine shuttle car comprising:
   a vertically flexible body having a pair of open ended body portions hinged together end-to-end about a horizontal transverse axis;
   a pair of steerable supporting wheels mounted on each end of said body, one of said pair of wheels being equalizer-mounted;
   a rotatable crank axle connected to said body intermediate the said pairs of steerable supporting wheels proximate the said horizontal transverse hinge axis, the throws of said crank axle being axially and arcuately spaced from each other;
   an elongated truck beam pivotally mounted on each of said crank throws adjacent a side of said body;

a pair of tandem drive wheels mounted on each of said beams, one of said drive wheels being mounted closer to the pivotal axis of said beam than the other drive wheel; and power means mounted on each of said beams remote from said one drive wheel and proximate the said other drive wheel, said power means being drivingly connected to said pair of drive wheels.

7. An equalized mine shuttle car comprising:

a vertically flexible body having a pair of open end body portions hinged together end-to-end about a horizontal transverse axis;

a rotatable crank axle extending along said transverse axis, the throws of said crank axle being axially and arcuately spaced from each other;

an elongated truck beam pivotally mounted on each of said crank throws adjacent a side of said body;

a pair of tandem drive wheels mounted on each of said beams, one of said drive wheels being mounted closer to the pivotal axis of said beam than the other drive wheel;

power means mounted on each of said beams remote from said one drive wheel and proximate the said other drive wheel, said power means being drivingly connected to said pair of drive wheels; and a pair of steerable supporting wheels mounted on each end of said body, one of said pair of steerable wheels being equalizer-mounted.

8. An equalized mine shuttle car comprising:

a vertically flexible body having a pair of open end body portions hinged together end-to-end about a horizontal transverse axis;

a pair of steerable supporting wheels mounted on each of said body, one of said pair of wheels being equalizer-mounted;

a rotatable crank axle connected to said body intermediate the said pairs of steerable supporting wheels proximate the said horizontal transverse hinge axis, the throws of said crank axle being axially and arcuately spaced from each other;

an elongated truck beam pivotally mounted intermediate its length on each of said crank throws defining a long portion and short portion of said beam;

an orbitally movable tractor tread mounted on each of said beams; and power means drivingly connected to each of said tractor treads, said power means disposed on the long portion of said beam remote from the pivotal connection with said crank throw, said power means providing a counter poise adapted to equalize the ground engaging pressure along the length of said tractor tread.

References Cited in the file of this patent
UNITED STATES PATENTS

| | | |
|---|---|---|
| 1,316,232 | Haupt | Sept. 16, 1919 |
| 2,336,386 | Beck | Dec. 7, 1943 |
| 2,399,929 | Kearns | May 7, 1946 |
| 2,488,520 | Beck | Nov. 22, 1949 |
| 2,634,008 | Osgood | Apr. 7, 1953 |
| 2,653,828 | Alley | Sept. 29, 1953 |
| 2,688,495 | Van Doorne | Sept. 7, 1954 |
| 2,904,341 | Heitshu | Sept. 15, 1959 |
| 2,962,176 | Russell | Nov. 29, 1960 |

UNITED STATES PATENT OFFICE
CERTIFICATE OF CORRECTION

Patent No. 3,154,163                                   October 27, 1964

Loy D. Hagenbook

It is hereby certified that error appears in the above numbered patent requiring correction and that the said Letters Patent should read as corrected below.

Column 4, line 24, for "aqualized" read -- equalized --; column 6, line 1, after "each" insert -- end --.

Signed and sealed this 2nd day of March 1965.

(SEAL)
Attest:

ERNEST W. SWIDER
Attesting Officer

EDWARD J. BRENNER
Commissioner of Patents